Patented Oct. 31, 1933

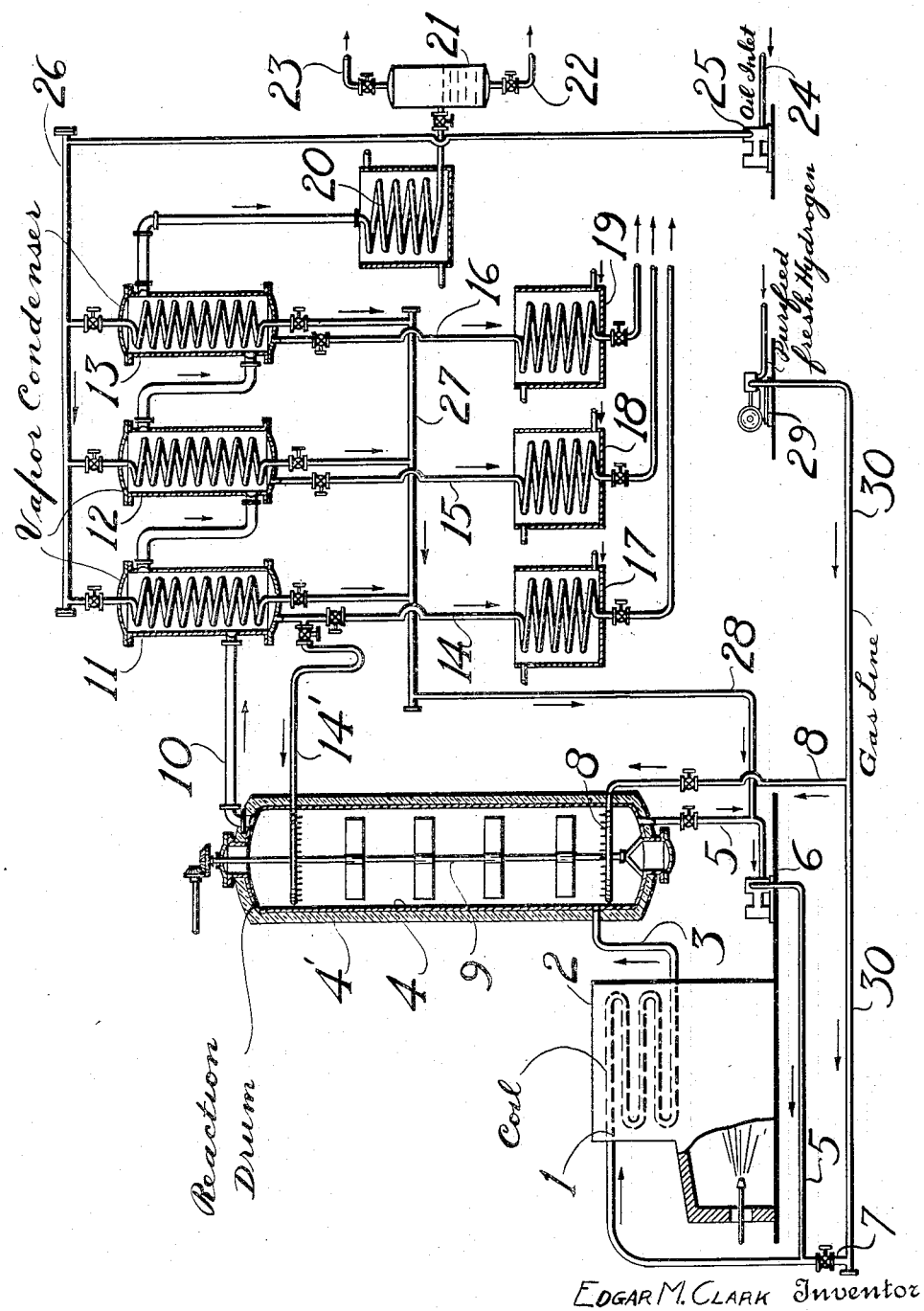

1,933,047

UNITED STATES PATENT OFFICE 1,933,047

IMPROVED PROCESS FOR THE TREATMENT OF PETROLEUM

Edgar M. Clark, New York, N. Y., assignor to Standard-I. G. Company

Application July 18, 1929. Serial No. 379,086

10 Claims. (Cl. 196—78)

The present invention relates to the art of obtaining valuable products from crude oil and the like and more specifically comprises a method for producing high quality lubricating oils and the like from crudes which have heretofore been considered unsatisfactory for the purpose. My invention will be fully understood from the following description and the drawing which illustrates one form of apparatus for accomplishing my method.

The drawing is a semi-diagrammatic view in sectional elevation of an apparatus constructed according to my invention and indicates the course of the material through the apparatus.

Referring to the drawing, reference character 1 denotes a pipe coil arranged in a furnace setting 2 for heating crude oil or the like to a high temperature. Coil 1 discharges through pipe 3 into a reaction drum 4, which is adapted to withstand high internal pressures, high temperature, and the corrosive effects of the reactants. Drum 4 may be protected against excessive loss of heat by an insulating layer 4' and is maintained at the desired temperature by any suitable means, for example, by internal electrical heating or preferably a part of the contents may be withdrawn from the drum by line 5 and recirculated through heating coil 1 by a pump 6. Hydrogen or a gas rich in free hydrogen is forced into the inlet of coil 1 by pipe 7 and may also be forced into drum 4 by spray pipe 8. The contents of the drum are preferably maintained in thorough agitation, for example, by means of a stirrer 9.

Vapor leaves drum 4 by a vapor line 10 which is connected with suitable separating equipment. In the drawing, three vapor condensers 11, 12, and 13 are shown arranged in series for passage of vapor. From each condenser, a separate condensate may be withdrawn by lines 14, 15, and 16, respectively, through coolers 17, 18, and 19 to storage tanks (not shown). Part of the condensate from condenser 11 may be returned to drum 4 by valved branch line 14' or by any other means, such as by mixing with the fresh feed. Vapor and non-condensible gas from vapor condenser 13 is conducted to a condenser 20 and separating drum 21 from which distillate is withdrawn by line 22 to storage (not shown) and gas is removed by line 23. The gas may be purified by removal of hydrogen sulphide and returned to the process, as will be understood.

Oil is fed to the system by line 24 and is forced by pump 25 to a manifold 26, from which it may be distributed through condensers 11, 12, and 13 to produce the desired cooling effect in each. Preheated oil is collected in a second manifold 27 from which it is conducted into line 5 by pipe 28 and thence into drum 4 by way of coil 1, as previously described.

Fresh hydrogen or a gas rich in the same, such as the gas from line 23 which has been purified, for example, by scrubbing with an aqueous soda solution to remove hydrogen sulphide and then with oil to dissolve hydrocarbons, is drawn from a suitable source (not shown), compressed by compressor 29 and fed to a gas line 30 which feeds lines 7 and 8, as described above.

In the operation of my process, crude oils, reduced crude or other heavy petroleum cuts, are subjected to a treatment with free hydrogen under high pressure and at a suitably elevated temperature. Pressure is always in excess of 25 atmospheres and is preferably in considerable excess. Pressures of 100 to 200 atmospheres, or higher, are contemplated in the use of my process. Temperature in the drum is preferably below that at which formation of light oil is rapid and is preferably between about 700 and 850° F. The exact temperature depends primarily on the nature of the stock and the nature of the specific catalyst used. It is preferable to limit the formation of light oil to not more than about 5 to 10%, boiling below 400° F. on the fresh oil fed, although it may be as high as 15 or 20%. The duration of the treatment, or the rate at which the oil is forced through the reaction chamber, is fixed at a suitable value so that the naphtha production is within the limits specified, namely, below 20%, or preferably even lower.

A great variety of catalysts may be successfully used in my process, such as finely divided metals, of which chromium, molybdenum, tungsten and uranium are preferred. The oxides of these metals may also be used, alone or in mixtures with other metals or their compounds. The most satisfactory catalysts are those of the class which are insensitive to poisoning by sulphur.

By my process it is possible to produce large yields of high grade lubricating distillate from crude oils containing impurities, the exact nature of which is unknown but which appears to be unsaturated, gummy, or resinous materials and apparently interferes with pressing, sweating and the other ordinary processes for refining such oils to produce lubricants. Superior cylinder stocks may also be made by my process from oils, such as Mid-Continent and Coastal crudes, and it is found that the Conradson carbon value of such cylinder stocks is considerably lower than that of oils made by other processes from similar crudes and oil of Pennsylvania grade may be made from mixed base or low cold test crudes without dewaxing.

Paraffin slop, which is a cut heavier than wax distillate and which cannot be pressed and sweated in the ordinary manner, may be treated by my process to produce good pressing distillate. If oils are too heavy to be conveniently handled directly, they may be diluted with lighter oils, such as gas oil, as will be understood. If a catalyst is used, it is preferably suspended in finely ground condition in the oil and pumped into the drum. It is thereafter circulated from the drum through coil 1 and back to the drum in a closed system. The catalyst may, however, be supported on lumps of kaolin or other suitable material packed into drum 4, or may be attached to the stirrer 9. The hydrogen circulated is greatly in excess of that which actually enters into combination with the oil, and it has been found satisfactory to circulate approximately 5000 cu. ft. per barrel of oil so treated, although more or less may be used.

As an example of the operation of my process, a cylinder oil of the following characteristics is treated with hydrogen at 3000 pounds per sq. inch in a reaction vessel at 792° F. The catalyst is a mixture of zinc, tungsten and magnesium oxides. The feed oil has the following characteristics:

| | |
|---|---|
| Gravity | 22.4° A. P. I. |
| Flash | 510° F. |
| Viscosity Saybolt @ 100° F. | 3710 sec. |
| Viscosity Saybolt @ 210° F. | 176 sec. |
| Conradson carbon | 3.4 % |
| Pour | 30° F. |
| Viscosity index | 85 |

About 5% of an oil boiling below 400° F. is produced and a 91% yield of an oil of the following superior quality:

| | |
|---|---|
| Gravity | 25.2° A. P. I. |
| Flash | 435 |
| Viscosity Saybolt @ 100° F. | 1049 sec. |
| Viscosity Saybolt @ 210° F. | 90 sec. |
| Conradson carbon | 1.4% |
| Pour | 45° F. |
| Viscosity index | 104 |

The flash may be raised by removal of a small quantity of light oil to over 500 or 520° F.

In many cases the recovery is greater than 100% by volume of the oil fed and usually the recovery on the weight basis is slightly below 100% of the oil. The oils are much improved as to general lubricating qualities, color and the like. Sulphur is greatly reduced.

In another example an uncompletely refined bright stock of the following inspection is used as the feed stock:

| | |
|---|---|
| Gravity | 23.1° A. P. I. |
| Viscosity at 100° F. | 2780 seconds Saybolt |
| Viscosity at 210° F. | 147½ seconds Saybolt |
| Viscosity index | 84 |
| Pour point | 20° F. |
| Flash | 510 |
| Color | ¾ Robinson |
| Carbon | 2% |
| Sulphur | .34% |

This oil is passed through a coil heater with hydrogen and thus heated to about 725° F. The reaction vessel which contains the catalyst of the type specified above is lagged and assumed an average temperature of 730–790° F. The rate of flow is carefully controlled at about .66 volumes of oil per hour per volume of reactor space, and the gas rate is about 7,000 cubic feet per barrel of oil (42 gallons).

The oil is cooled and separated from the gas. The yield of the products and inspections are as follows, the total yield of oil being 103.1% of the oil fed:

| | Gasoline | Gas oil | Total lubricating oil |
|---|---|---|---|
| Yield | 7.2% | 28.8% | 67.0 |
| Gravity | 53.1° A.P.I. | 32.1° | 29.4° |
| Viscosity at 100° F. | | | 627 Say. seconds |
| Viscosity at 210° F. | | | 74 |
| Vis. index | | | 108 |
| Color | | | 11¼ R. |
| Carbon | | | .026% |

The velocity of flow as above noted was carefully adjusted to give the required lubricating oil improvement (viscosity index) and at the same time to limit the gasoline production to below 10%, specifically 7.2%. The oil might be fractionated differently to produce other grades of products, for example:

| | Gasoline | Gas oil | Light lubricating oil | Heavy lubricating oil |
|---|---|---|---|---|
| Yield | 7.2% | 26.3% | 37.3% | 32.2% |
| Gravity | 53.2° A.P.I. | 32.4° A.P.I. | 29.1° A.P.I. | 29.1° A.P.I. |
| Vis. @ 100 | | | 286 sec. Say. | 1411 sec. Say. |
| Vis. @ 210 | | | 52.7 sec. Say | 118.5 sec. Say. |
| Vis. index | | | 107 | 108. |
| Color | | | 17 R. | 10¾ R. |
| Carbon | | | .006% | .000%. |

The term "viscosity index" in the above example is a measure of the slope of the viscosity-temperature curve. Its determination and significance is described by Davis and Dean, Chem. & Met. Eng. 36, 618 (1929).

My improved process is not to be limited by any theory of the mechanism of the process, nor by any example given merely for purpose of illustration, but only by the following claims in which I wish to claim all novelty inherent in my invention.

I claim:

1. An improved process for producing higher grade lubricating oils of increased viscosity index in relatively large yields from lower grade petroleum, comprising subjecting the oil to the action of hydrogen in presence of sulphur insensitive catalysts at a temperature between the approximate limits of 700 and 850° F., and at pressure in excess of 25 atmospheres, and limiting the duration of the operation whereby a substantial quantity of naphtha, less than 20% of the oil fed, is produced and the lubricating fractions are substantially increased with respect to viscosity index.

2. An improved process for producing large yields of heavy hydrocarbons of substantially increased viscosity index from petroleum of inferior quality therefor, comprising subjecting the oil to the action of hydrogen in the presence of sulphur insensitive catalysts at a temperature between the approximate limits of 700 to 850° F., and at pressure in excess of about 100 atmospheres, and withdrawing the oil when a substantial quantity of naphtha has been produced and before is exceeds 20% of the oil fed.

3. An improved process for converting heavy petroleum hydrocarbons of inferior value as lubricants into those of a higher viscosity index in large yields, comprising subjecting such hydrocarbons to the action of hydrogen in the presence of sulphur insensitive catalysts at a temperature between the approximate limits of 700 and 850° F., and at pressure of the order of 200 atmospheres, whereby the heavy hydrocarbons are converted while naphtha formation is relatively slow, and withdrawing the oil after the yield of light oil boiling below 400° F. becomes substantial but before it exceeds 15% of the feed.

4. An improved process according to claim 3 in which the pressure is in excess of 200 atmospheres.

5. An improved process according to claim 3 in which the catalyst comprises a sixth group metal.

6. An improved process according to claim 3 in which the catalyst comprises an oxide of a sixth group metal.

7. An improved process according to claim 3 in which the oil is withdrawn before the yield of light oil boiling below 400° F. exceeds 15%.

8. An improved process according to claim 3 in which the oil is withdrawn before the yield of light oil boiling below 400° F. exceeds 10%.

9. An improved process according to claim 3 in which the oil is withdrawn before the yield of light oil boiling below 400° F. exceeds 5%.

10. An improved process for producing lubricating oils of increased viscosity index in relatively large yields from lower grade petroleum, comprising subjecting the lower grade oil to the action of hydrogen in the presence of catalysts immune to sulphur poisoning at a temperature lying within the lower portion of the range of temperatures usually employed in liquid phase cracking and at a pressure in excess of 25 atmospheres, and limiting the duration of the operation so that the lubricating oil is improved while a substantial quantity of naphtha but below 20% of the oil fed is produced.

EDGAR M. CLARK.